United States Patent [19]
Yamashita

[11] Patent Number: 5,737,412
[45] Date of Patent: Apr. 7, 1998

[54] PORTABLE TELEPHONE WITH A CARRYING STRAP

[75] Inventor: Koji Yamashita, Tokyo, Japan

[73] Assignee: NEC Corporation, Tokyo, Japan

[21] Appl. No.: 652,922

[22] Filed: May 24, 1996

[30] Foreign Application Priority Data

May 24, 1995 [JP] Japan .................................. 7-125456

[51] Int. Cl.⁶ .................................................. H04M 1/00
[52] U.S. Cl. ............................. 379/446; 379/454; 379/455
[58] Field of Search ............................ 379/433, 428, 379/454, 455, 446, 449; 455/90, 575

[56] References Cited

U.S. PATENT DOCUMENTS 4,419,770  12/1983  Yagi et al. .

FOREIGN PATENT DOCUMENTS

| 0 616 458 A1 | 3/1993 | European Pat. Off. . |
| 0 635 963 A2 | 7/1994 | European Pat. Off. . |
| 1-265750 | 10/1989 | Japan . |
| 4-14322 | 1/1992 | Japan . |
| 4-347103 | 12/1992 | Japan . |
| 2 266 452 A | 11/1993 | United Kingdom . |
| 2 269 072 A | 1/1994 | United Kingdom . |
| WO 92/22146 A1 | 12/1992 | WIPO . |

*Primary Examiner*—Jack Chiang
*Attorney, Agent, or Firm*—Scully, Scott, Murphy & Presser

[57] ABSTRACT

A portable telephone has a body (1), a battery pack (2), and a strap (6). The battery pack (2) is rotatable toward and away from the body (1) by being fulcrumed by the lower end (4) of the body (1). A latch mechanism (3) for latching the battery pack (2) is provided on the top of the body (1). A lock mechanism 8 is provided on the battery pack 2 and engageable with a part of the latch mechanism (3).

4 Claims, 3 Drawing Sheets

PORTABLE TELEPHONE WITH A CARRYING STRAP

BACKGROUND OF THE INVENTION

The present invention relates to a portable telephone and, more particularly, to a portable telephone having a carrying strap.

Due to the miniaturization of portable telephones and other portable electronic apparatuses, straps for carrying them have recently been implemented more as hand straps than as shoulder straps. Shoulder straps for the above application are taught in, e.g., Japanese Patent Laid-Open Publication Nos. 4-347103 (Document 1) and 4-14322 (Document 2) while a hand strap is disclosed in Japanese Patent Laid-Open Publication No. 1-265750 (Document 3) by way of example.

The conventional portable telephones with the straps, whether they be shoulder straps or hand straps, must each be provided with an anchoring portion and metal fitting for the strap on its body. Moreover, the belt is implemented as a part inseparable from the apparatus body, i.e., having no alternatives. On the other hand, the portable telephone is carried in some different ways matching the users' tastes and realized by the miniaturization and spread of such a telephone.

However, none of the conventional portable telephones allows the users to choose belts matching their own tastes. Further, the metal fitting to be arranged in the anchoring portion is expensive. In addition, the shape of the belt is limited by the configuration of the anchoring portion. For example, if the anchoring portion is narrow, then only a belt having a string-like end is usable. The belt should desirably be provided with a width broad enough for the user to hold the apparatus body stably by hand.

SUMMARY OF THE INVENTION

It is therefore an object of the present invention to provide a portable telephone which is easy to carry and allows a strap matching the user's taste to be removably attached thereto.

A portable electronic apparatus of the present invention has a body, a battery pack mounted on the body and rotatable toward and away from the body about one end thereof engaged with the lower end of the body, and a strap for holding the apparatus. A latch mechanism is provided on the upper end of the body for latching the battery pack. A lock mechanism is provided on the battery pack for selectively mating with the latch mechanism.

The battery pack is formed with grooves for the lock mechanism in the center of its other end. The lock mechanism is positioned in the range of the grooves.

Further, the lock mechanism has lugs for hooking one end of the strap and a recess for mating with the latch mechanism.

BRIEF DESCRIPTION OF THE DRAWINGS

The above and other objects, features and advantages of the present invention will become apparent from the following detailed description when taken with the accompanying drawings in which.

In the drawings, identical reference numerals denote identical structural elements.

DETAILED DESCRIPTION OF THE PREFERRED EMBODIMENT

Figure 1:
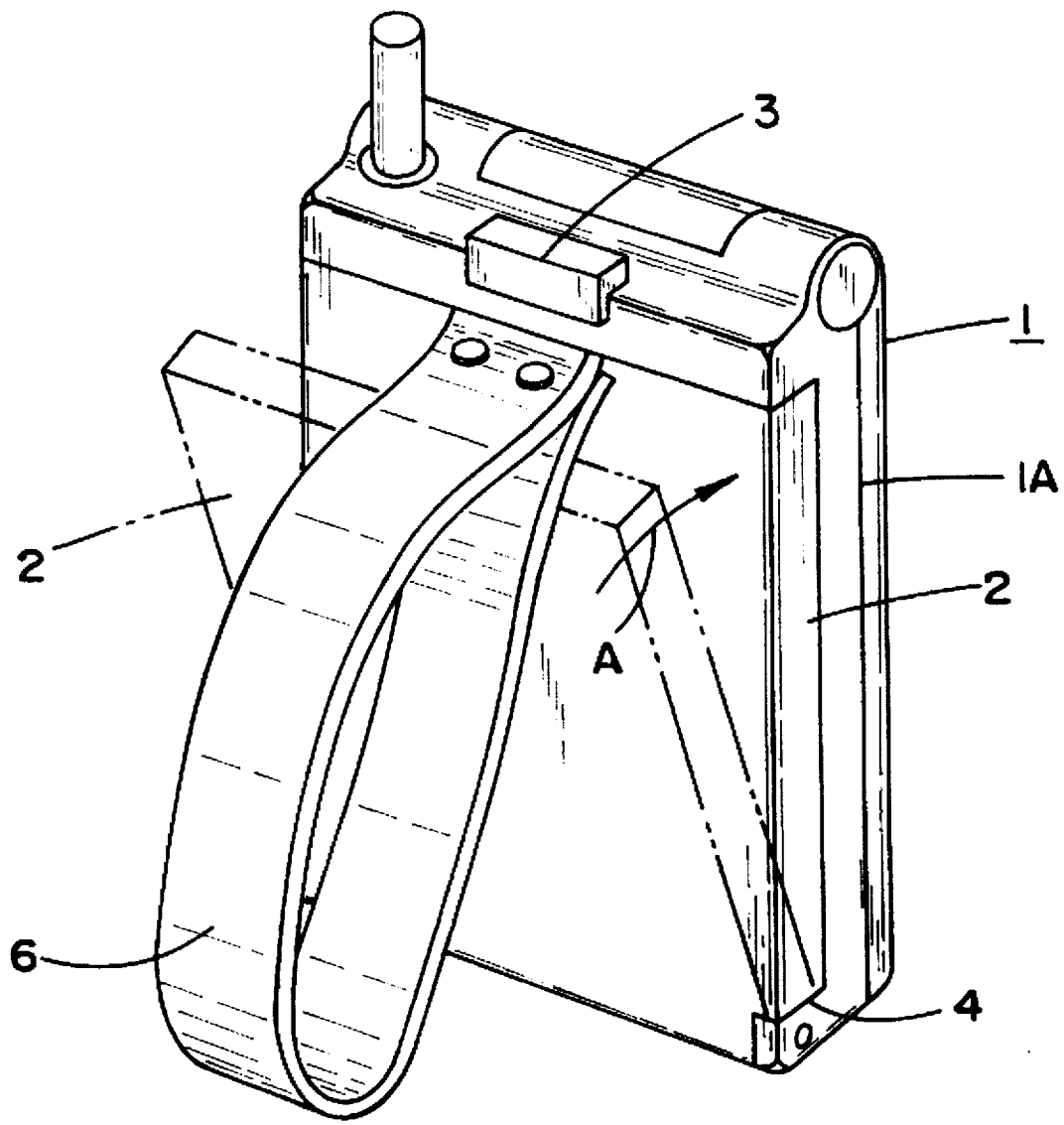
FIG. 1 is an external perspective view showing a portable telephone with a strap embodying the present invention.
Figure 2:
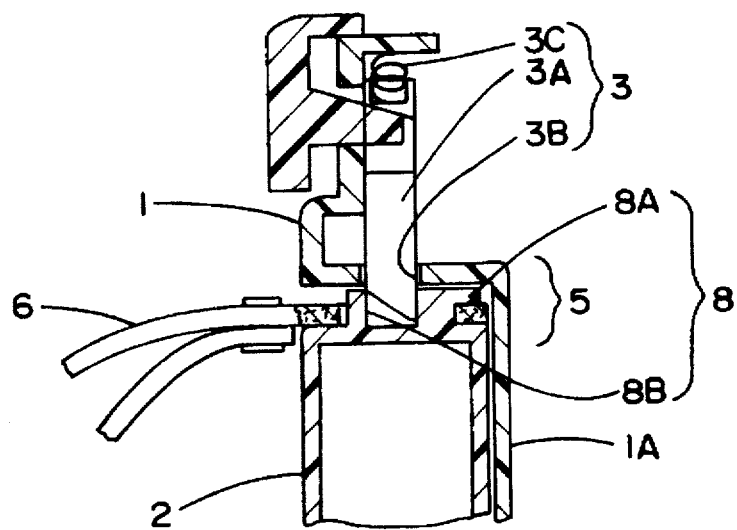
FIG. 2 is a section showing an arrangement for locking a battery pack to the body of the telephone shown in FIG. 1.
Figure 3:
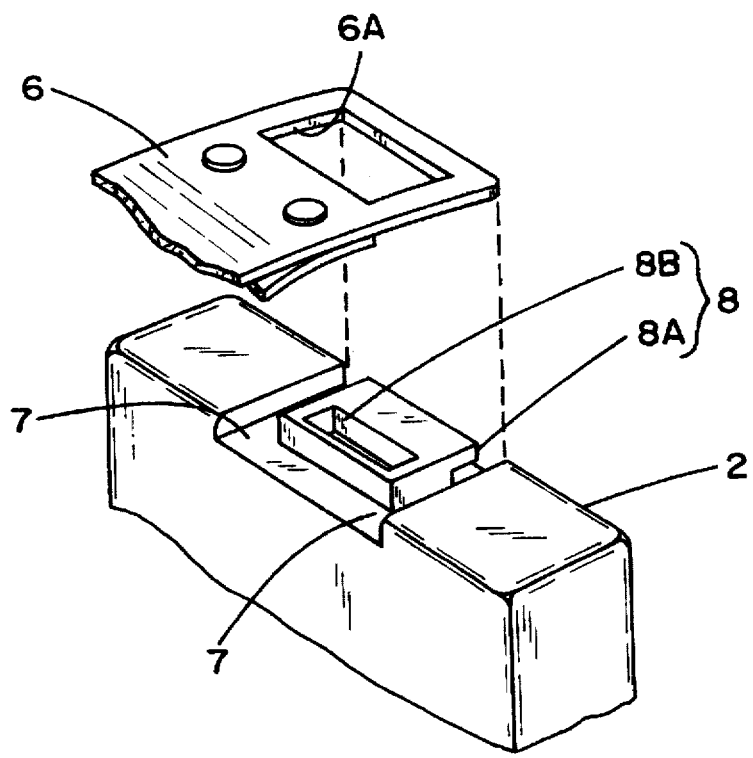
FIG. 3 shows the configuration of the battery pack for anchoring the strap and mating with the body of the telephone.

Referring to FIGS. 1 through 3, a portable telephone embodying the present invention is shown. As shown, the telephone has a body 1 which is flat and thin enough to be held by one hand. A battery pack 2 is mounted on the body 1 and so fulcrumed by the lower end 4 of the body 1 as to be turned up and down, as needed.

Figure 4:
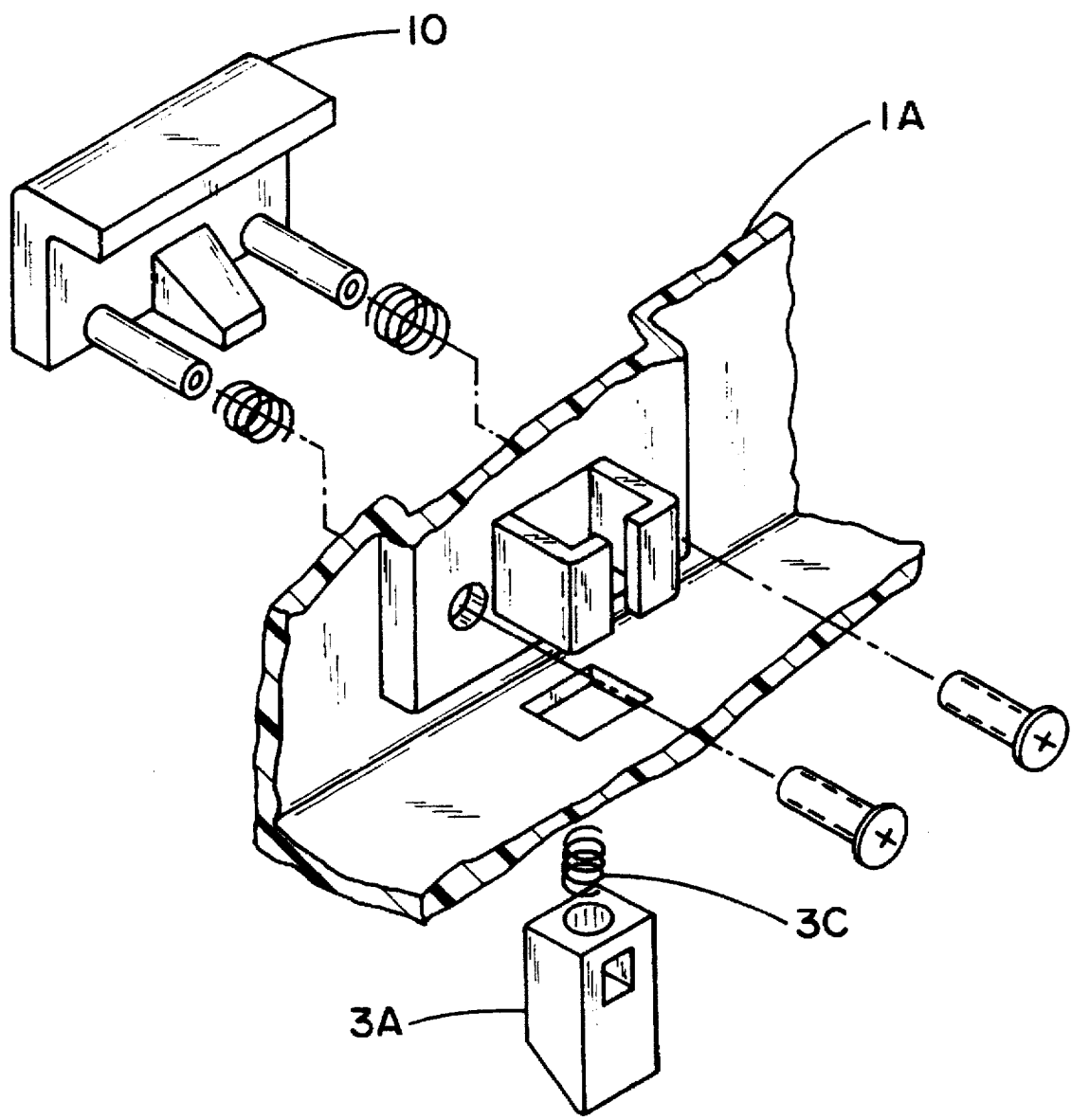
FIG. 4 is an illustration showing part of FIG. 2.

A latch mechanism 3 is provided on the top of the body 1, as viewed in FIG. 1. As shown in FIG. 2, the latch mechanism 3 includes a knob or latch 3A mounted on the body 1 and movable up and down by a hook 10, a hole 3B formed through the body 1 for guiding the movement of the knob 3A and a spring 3C to press the knob 3A. Specifically, the body 1 has a casing 1A which is formed with the hole 3B at its top center, as viewed in FIG. 1. A shown in FIG. 4, the hook is fixed to the casing 1A through springs and screws.

As shown in FIG. 2, a locking portion 5 is formed partly by the body 1 and partly by the battery pack 2. As shown in FIG. 3, the locking portion 5 of the battery pack 2 includes a pair of grooves 7 facing the latch mechanism 3 for receiving one end of a strap 6. A lock mechanism 8 is positioned between the grooves 7 and has lugs 8A and a recess 8B. The lugs 8A are used to removably anchor one end of the strap 6. The recess 8B is configured to receive a part of the latch mechanism 3.

To mount the battery pack 2 to the body 1, one end of the pack 2 is hooked to the lower end 4 of the body 1 (FIG. 1), as indicated by a dash-and-dots line in FIG. 1. Then, the battery pack 2 is turned in a direction indicated by an arrow in FIG. 1 until its upper end has been received in the locking portion 5 of the body 1, as indicated by a solid line in FIG. 1. As a result, the battery pack 2 is automatically locked to the body 1. The knob 3A mounted on the body 1 is constantly biased downward, as viewed in FIG. 1, by the spring 3C. When the upper end of the battery pack 2 is received in the locking portion 5 of the body 1, the knob 3A is automatically snapped into the recess 8B of the lock mechanism 8.

A hole 6A is formed in one end of the strap 6. To fit the strap 6 on the telephone, the edges of the hole 6A are hooked to the lugs 8A of the locking portion 5. Subsequently, the battery pack 2 is brought to the position indicated by the solid line in FIG. 1 by the procedure described above.

As stated above, the strap 6 is removably attached to the telephone by use of the arrangement for locking the battery pack 2 to the body 1. Therefore, the belt 6 can be set at substantially the center of the body 1. This allows the strap 6 to be provided with a broad width. It follows that the strap 6 can be formed of any desired material, e.g., leather, cloth or plastics and can be provided with any desired design including color. In addition, the strap 6 is easy to attach to the telephone.

Furthermore, the strap 6 can be provided with a shape fitting the user's hand while being carried by the user. This not only promotes easy handling but enhances stability. The above arrangement for affixing the strap 6 is particularly effective when applied to, e.g., a foldable telephone due to the balance between the battery pack 2 and the body 1.

In summary, the strap 6 of the illustrative embodiment is retained by the locking portion 5 of the battery pack 2, and can therefore be easily attached and detached from the telephone. As a result, a special metal fitting or similar member for retaining the strap 6 does not have to be provided on the body 1. This successfully reduces the cost of the telephone.

What is claimed is:

1. A portable electronic apparatus comprising:

a body;

a battery pack mounted on said body and rotatable toward and away from said body about one end thereof engaged with a lower end of said body;

a detachable strap for holding said apparatus, said strap having a hole formed proximate one end thereof;

a latch mechanism provided on an upper end of said body for latching said battery pack;

a lock mechanism provided on said battery pack for selectively mating with said latch mechanism, said battery pack including spaced grooves for said lock mechanism located in a center portion of the outer end of said battery pack, said lock mechanism being positioned intermediate said grooves, and said lock mechanism including lugs for hooking into the hole at said one end of said strap and a recess for mating with said latch mechanism whereby said strap is latched to said apparatus in the mated condition of said lock mechanism and latch mechanism and is detachable from said apparatus in the released condition of said mechanisms.

2. A mechanism for detachably fitting a strap for carrying a portable electronic apparatus having a battery pack to said apparatus, comprising:

a first and a second locking mechanism respectively provided on an upper end and a lower end of said apparatus, and for mounting said battery pack to said apparatus; and a third locking mechanism provided on said battery pack for selectively mating with said first locking mechanism; said battery pack including spaced grooves for said third locking mechanism in a center portion of the other end of said battery pack, said third locking mechanism being positioned intermediate said grooves, said third locking mechanism including lugs for hooking one end of said strap and a recess for mating with said first locking mechanism.

3. A mechanism as claimed in claim 2, wherein a hole is formed in said strap proximate one end thereof, said lugs being engageable in said hole at said one end of the strap.

4. A mechanism as claimed in claim 3, wherein said strap is latched to said apparatus in the mated condition of said first and third locking mechanisms and is detachable from said apparatus in the released condition of said first and third locking mechanisms.

* * * * *